(12) United States Patent
    Gabriel

(10) Patent No.: US 10,732,609 B2
(45) Date of Patent: Aug. 4, 2020

(54) METHODS AND APPARATUSES TO PRODUCE FLUID CONTROL DEVICE COMPONENTS AND RELATED FLUID CONTROL DEVICES

(71) Applicant: FISHER CONTROLS INTERNATIONAL LLC, Marshalltown, IA (US)

(72) Inventor: Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 68 days.

(21) Appl. No.: 16/056,027

(22) Filed: Aug. 6, 2018

(65) Prior Publication Data
    US 2020/0042669 A1    Feb. 6, 2020

(51) Int. Cl.
    *B33Y 50/00*        (2015.01)
    *G05B 19/4093*      (2006.01)
    (Continued)

(52) U.S. Cl.
    CPC .......... *G05B 19/4093* (2013.01); *B33Y 50/00* (2014.12); *B33Y 80/00* (2014.12); *G05B 19/4099* (2013.01)

(58) Field of Classification Search
    CPC ............. G06F 17/5086; G06F 2206/00; G06F 2217/02; G06F 2217/12; G06F 2217/06; B33Y 50/00; B33Y 80/00
    See application file for complete search history.

(56) References Cited

U.S. PATENT DOCUMENTS 5,659,478 A * 8/1997 Pennisi .............. G05B 19/4099
                                                    700/95
5,680,530 A * 10/1997 Selfridge .............. G06F 17/509
                                                    345/440
(Continued)

FOREIGN PATENT DOCUMENTS

| WO | WO-2014/066538 A1 | 5/2014 |
| WO | WO-2016/187246 A1 | 11/2016 |
| WO | WO-2017/196605 A1 | 11/2017 |

OTHER PUBLICATIONS

International Search Report and Written Opinion for PCT/US2019/045076, dated Nov. 27, 2019.

*Primary Examiner* — Christopher E. Everett
(74) *Attorney, Agent, or Firm* — Marshall, Gerstein & Borun LLP

(57) ABSTRACT

Methods and apparatus to produce fluid control device components are related fluid control devices. An example method of producing a valve component, includes: accessing a first request from a user interface device to produce a valve component, the first request specifying first characteristics of the valve component; when the first characteristics are not associated with a first build file, comparing the first characteristics to first reference characteristics to determine if the first characteristics satisfy a threshold; if the first characteristics do not satisfy the threshold, providing feedback accessible at the user interface device to change the first characteristics to second characteristics, where the second characteristics satisfy the threshold; and when the first characteristics are associated with the first build file or when the first or second characteristics satisfy the threshold, causing, using the one or more processors, an additive manufacturing machine to produce the valve component.

20 Claims, 12 Drawing Sheets

(51) Int. Cl.
*B33Y 80/00* (2015.01)
*G05B 19/4099* (2006.01)

(56) References Cited

U.S. PATENT DOCUMENTS

| | | | | |
|---|---|---|---|---|
| 5,825,651 A | * | 10/1998 | Gupta | G05B 19/4097 700/103 |
| 2001/0016803 A1 | * | 8/2001 | Sartiono | G05B 19/4097 703/1 |
| 2003/0187870 A1 | * | 10/2003 | Nakajima | G06F 17/50 |
| 2007/0233630 A1 | * | 10/2007 | Kulkarni | G06Q 10/06 706/47 |
| 2010/0145492 A1 | * | 6/2010 | Russell | G06F 17/50 700/103 |
| 2011/0087350 A1 | * | 4/2011 | Fogel | G06F 17/50 700/98 |
| 2015/0036174 A1 | * | 2/2015 | Pettis | G06F 3/1288 358/1.15 |
| 2015/0112835 A1 | * | 4/2015 | Stewart | H04N 21/23614 705/26.8 |
| 2015/0158252 A1 | * | 6/2015 | Liu | G05B 15/02 700/98 |
| 2015/0197064 A1 | * | 7/2015 | Walker | G06F 17/50 700/98 |
| 2015/0247474 A1 | * | 9/2015 | Evers | B22F 3/1055 123/193.6 |
| 2015/0258440 A1 | | 9/2015 | Zhang et al. | |
| 2015/0321427 A1 | | 11/2015 | Gunnarsson et al. | |
| 2015/0331402 A1 | * | 11/2015 | Lin | G06F 17/5009 700/119 |
| 2017/0102089 A1 | * | 4/2017 | Griffin, Jr. | B33Y 30/00 |
| 2017/0169492 A1 | | 6/2017 | Reggiardo, III et al. | |
| 2017/0173888 A1 | | 6/2017 | Thomas-Lepore et al. | |
| 2017/0326668 A1 | * | 11/2017 | Grabau | B23K 9/048 |
| 2017/0326692 A1 | * | 11/2017 | Lai | F16K 27/00 |
| 2017/0372284 A1 | * | 12/2017 | Levy | B33Y 50/00 |
| 2018/0225408 A1 | * | 8/2018 | Ziolo | G06F 17/50 |

* cited by examiner

EQUATIONS DRIVING SKETCH DIMENSIONAL VALUES

EQUATIONS, GLOBAL VARIABLES, AND DIMENSIONS

| NAME | VALUE / EQUATION | EVALUATES TO | COMMENTS |
|---|---|---|---|
| ☐ GLOBAL VARIABLES | | | |
| "A_FLOW" | = 18.5 | 18.5 | |
| "B_FLOW" | = 18.5 | 18.5 | |
| "C_FLOW" | = 18.5 | 18.5 | |
| "D_FLOW" | = 18.5 | 18.5 | |
| "E_FLOW" | = 19.60 | 19.6 | |
| "F_FLOW" | = 22.60 | 22.6 | |
| "G_FLOW" | = 27.40 | 27.4 | |
| "H_FLOW" | = 35.80 | 35.8 | |
| "J_FLOW" | = 42.20 | 42.2 | |
| "K_FLOW" | = 45.70 | 45.7 | |
| "L_FLOW" | = 46.00 | 46 | |
| "M_FLOW" | = 46.00 | 46 | |
| "A_TRAVEL" | = 5.10 | 5.1 | |
| "B_TRAVEL" | = 10.20 | 10.2 | |
| "C_TRAVEL" | = 15.20 | 15.2 | |
| "D_TRAVEL" | = 20.30 | 20.3 | |
| "E_TRAVEL" | = 25.40 | 25.4 | |
| "F_TRAVEL" | = 30.50 | 30.5 | |
| "G_TRAVEL" | = 35.60 | 35.6 | |
| "H_TRAVEL" | = 40.60 | 40.6 | |
| "J_TRAVEL" | = 43.20 | 43.2 | |
| "K_TRAVEL" | = 45.70 | 45.7 | |
| "L_TRAVEL" | = 48.30 | 48.3 | |
| "M_TRAVEL" | = 50.80 | 50.8 | |
| ADD ******* | | | |
| ☐ FEATURE | | | |
| ADD ******* | | | |

☐ AUTOMATICALLY REBUILD   ANGULAR EQUATION UNITS: DEGREES   ☑ AUTOMATIC SOLVE ORDER
☐ LINK TO EXTERNAL FILE:

OK  CANCEL  IMPORT...  EXPORT...  HELP

The list or tree shows the rules that you selected. Select a rule to edit.

◉ View Tree  ◎ View List    [Build]

- 31B3593
  - File Name .........Rule = AFlowWidth
  - Dimension (A_Flow) .........Rule = AFlowWidth
  - Dimension (B_Flow) .........Rule = BFlow
  - Dimension (C_Flow) .........Rule = CFlow
  - Dimension (D_Flow) .........Rule = DFlow
  - Dimension (E_Flow) .........Rule = EFlow
  - Dimension (F_Flow) .........Rule = FFlow
  - Dimension (G_Flow) .........Rule = GFlow
  - Dimension (H_Flow) .........Rule = HFlow
  - Dimension (J_Flow) .........Rule = JFlow
  - Dimension (K_Flow) .........Rule = KFlow
  - Dimension (L_Flow) .........Rule = LFlow
  - Dimension (M_Flow) .........Rule = MFlow
  - Dimension (A_Travel) .........Rule = ATravel
  - Dimension (B_Travel) .........Rule = BTravel
  - Dimension (C_Travel) .........Rule = CTravel
  - Dimension (D_Travel) .........Rule = DTravel
  - Dimension (E_Travel) .........Rule = ETravel
  - Dimension (F_Travel) .........Rule = FTravel
  - Dimension (G_Travel) .........Rule = GTravel
  - Dimension (H_Travel) .........Rule = HTravel
  - Dimension (J_Travel) .........Rule = JTravel
  - Dimension (K_Travel) .........Rule = KTravel
  - Dimension (L_Travel) .........Rule = LTravel
  - Dimension (M_Travel) .........Rule = MTravel

FIG. 10

METHODS AND APPARATUSES TO PRODUCE FLUID CONTROL DEVICE COMPONENTS AND RELATED FLUID CONTROL DEVICES

FIELD OF THE DISCLOSURE

The present patent relates generally to fluid control device components and, in particular, relates to methods and apparatuses to produce fluid control device components and related fluid control devices.

BACKGROUND

Fluid control devices may be used to control the flow of process fluid at a process control facility. Depending on the type of process in which the fluid control devices are implemented, the fluid control devices may be structured differently.

SUMMARY

In accordance with a first example, a method of producing a valve component includes accessing, using one or more processors, a first request from a user interface device to produce a valve component, the first request specifying first characteristics of the valve component; determining whether the first characteristics are associated with a first build file. When it is determined that the first characteristics are not associated with the first build file, comparing, using the one or more processors, the first characteristics to first reference characteristics to determine if the first characteristics satisfy a threshold. If the first characteristics do not satisfy the threshold, providing feedback, using the one or more processors, accessible at the user interface device to change the first characteristics to second characteristics, where the second characteristics satisfy the threshold. When the first characteristics are associated with the first build file or when the first or second characteristics satisfy the threshold, causing, using the one or more processors, an additive manufacturing machine to produce the valve component.

In accordance with a second example, an apparatus for producing valve components, the apparatus includes one or more processors; a communication unit; and one or more non-transitory computer-readable media coupled to the one or more processors and to the communication unit, the one or more non-transitory computer readable media storing instructions thereon that, when executed by the one or more processors, cause the one or more processors to: access a first request from a user interface device to produce a valve component, the first request specifying first characteristics of the valve component; determine whether the first characteristics are associated with a first build file; when it is determined that the first characteristics are not associated with a first build file, compare the first characteristics to reference characteristics to determine if the first characteristics satisfy a threshold; if the first characteristics do not satisfy the threshold, provide feedback accessible at the user interface to change the first characteristics to second characteristics where the second characteristics satisfy the threshold; and when the first characteristics are associated with the first build file or when the first or second characteristics satisfy the threshold, cause an additive manufacturing machine to produce the valve component.

In accordance with a third example, one or more non-transitory computer readable media storing instructions thereon that, when executed by one or more processors, cause the one or more processors to: access a first request from a user interface device to produce a valve component, the first request specifying first characteristics of the valve component; determine whether the first characteristics are associated with a first build file; when it is determined that the first characteristics are not associated with a first build file, compare the first characteristics to reference characteristics to determine if the first characteristics satisfy a threshold; if the first characteristics do not satisfy the threshold, provide feedback accessible at the user interface to change the first characteristics to second characteristics where the second characteristics satisfy the threshold; and when the first characteristics are associated with the first build file or when the first or second characteristics satisfy the threshold, cause an additive manufacturing machine to produce the valve component.

In further accordance with the foregoing first, second and/or third examples, an apparatus and/or method may further include any one or more of the following:

In accordance with one example, when the first characteristics are changed to the second characteristics, determining whether the second characteristics are associated with the build file, and wherein, when it is determined that the first and second characteristics are not associated with the first build file, changing the first build file to a second build file based on the first or second characteristics, and causing the additive manufacturing machine to produce the valve component based on the second build file.

In accordance with another example, changing the first build file to the second build file includes using parametric three-dimensional modeling software.

In accordance with another example, the method includes causing post-production processes to be performed on the valve component based on the first build file.

In accordance with another example, the method includes causing the characteristics of the valve component to be measured and comparing the measured characteristics to second reference characteristics to determine if the measured characteristics satisfy a second threshold, and wherein when the measured characteristics satisfy the second threshold, associating a first identifier with the valve component, and wherein when the measured characteristics do not satisfy the second threshold, associating a second identifier with the valve component.

In accordance with another example, the method includes accessing second valve components and causing the valve component to be incorporated into a valve assembly including the second valve components.

In accordance with another example, the method includes providing the valve assembly to an individual or an entity associated with the first request.

In accordance with another example, the method includes providing the valve component to an individual or an entity associated with the first request.

In accordance with another example, when the first characteristics are changed to the second characteristics, the instructions, when executed by the one or more processors, further cause the one or more processors to determine whether the second characteristics are associated with the build file, and wherein, when it is determined that the first and second characteristics are not associated with the first build file, the instructions, when executed by the one or more processors, further cause the one or more processors to change the first build file to a second build file based on the first or second characteristics and cause the additive manufacturing machine to produce the valve component based on the second build file.

In accordance with another example, changing the first build file to the second build file includes using parametric three-dimensional modeling software.

In accordance with another example, when the first characteristics are not associated with the first build file, the instructions, when executed by the one or more processors, further cause the one or more processors to cause post-production processes to be performed on the valve component based on the first build file.

In accordance with another example, the instructions, when executed by the one or more processors, further cause the one or more processors to: cause the characteristics of the valve component to be measured; compare the measured characteristics to second reference characteristics to determine if the measured characteristics satisfy a second threshold; when the measured characteristics satisfy the threshold, cause a first identifier to be associated with the valve component; and when the measured characteristics do not satisfy the threshold, cause a second identifier to be associated with the valve component.

In accordance with another example, the instructions, when executed by the one or more processors, further cause a valve assembly including the valve component to be provided to an individual or an entity associated with the first request or cause the valve component to be provided to the individual or the entity associated with the first request.

In accordance with another example, when the first characteristics are changed to the second characteristics, the instructions, when executed by the one or more processors, further cause the one or more processors to determine whether the second characteristics are associated with the build file, and wherein when the first and second characteristics are not associated with the first build file, the instructions, when executed by the one or more processors, further cause the one or more processors to change the first build file to a second build file based on the first or second characteristics and cause the additive manufacturing machine to produce the valve component based on the second build file.

In accordance with another example, changing the first build file to the second build file includes using parametric three-dimensional modeling software.

In accordance with another example, when the first or second characteristics are not associated with the first build file, the instructions, when executed by the one or more processors, cause the one or more processors to further cause post-production processes to be performed on the valve component based on the first build file.

In accordance with another example, the instructions, when executed by the one or more processors, further cause the one or more processors to: cause the characteristics of the valve component to be measured; compare the measured characteristics to reference characteristics to determine if the measured characteristics satisfy a threshold; when the measured characteristics satisfy the threshold, cause a first identifier to be associated with the valve component; and when the measured characteristics do not satisfy the threshold, cause a second identifier to be associated with the valve component.

In accordance with another example, the instructions, when executed by the one or more processors, further cause a valve assembly including the valve component to be provided to an individual or an entity associated with the first request or cause the valve component to be provided to the individual or the entity associated with the first request.

BRIEF DESCRIPTION OF THE DRAWINGS

FIG. 7 illustrates an example user interface that can be displayed at the example user interface device of the system of FIG. 1.

FIG. 10 illustrates another example user interface that can be displayed at the example user interface device of the system of FIG. 1.

DETAILED DESCRIPTION

Figure 1:
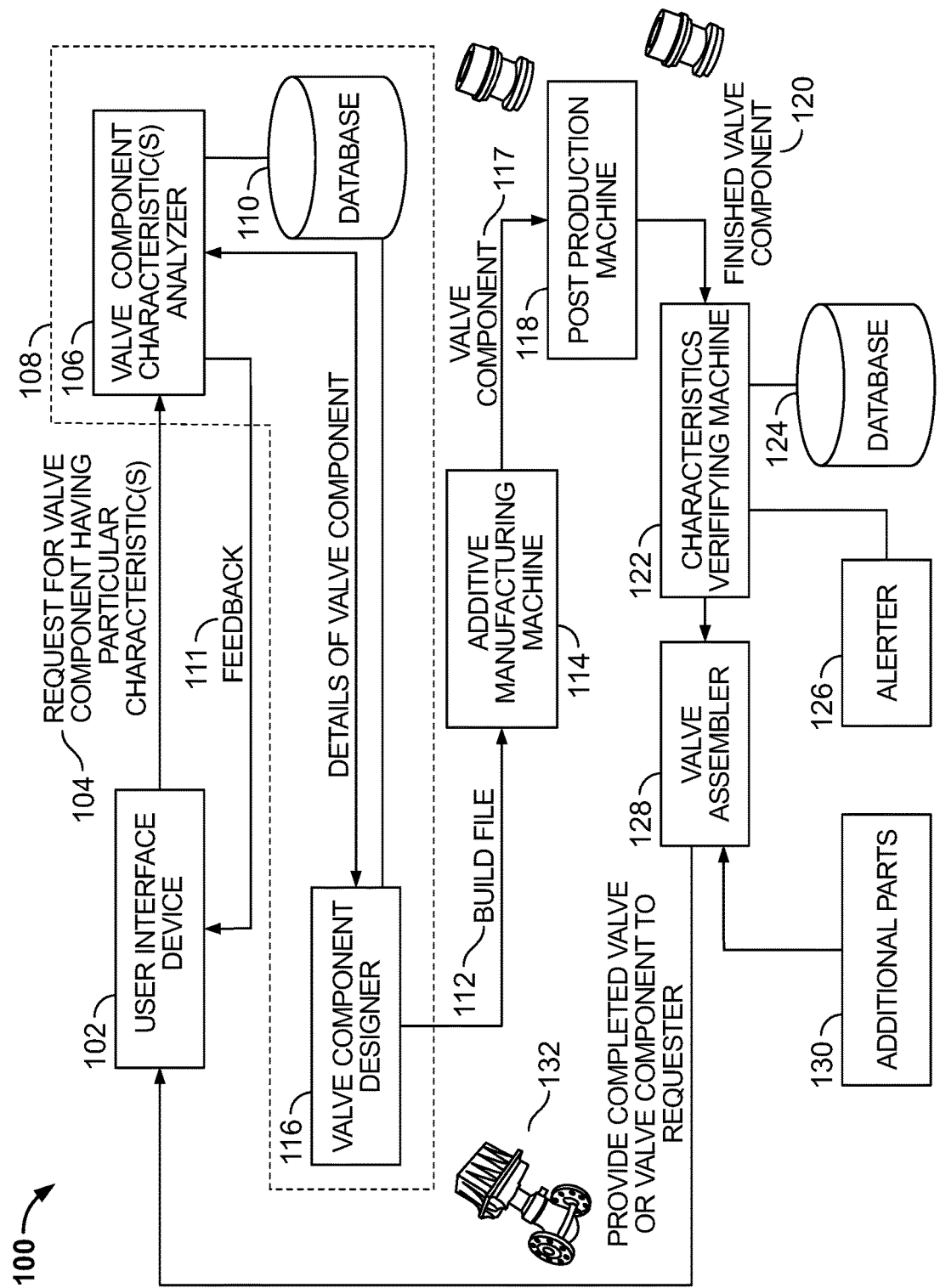
FIG. 1 illustrates an example system that may be used to produce one or more valve components in accordance with the teachings of this disclosure.

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

The examples disclosed herein relate to adaptive configuration processes that can be used to manufacture components for fluid control devices such as, for example, valve bodies, valve bonnets, valve seat ring retainers, valve trim, Coriolis meters having flow dividing fins and/or lattice used in association with attenuating flammable media. The examples disclosed herein can be used to reduce the mass of components while maintaining structural integrity. For example, if a first shutoff force is applied to a valve plug, the disclosed examples may produce a valve plug including a first amount of material while if a second shutoff force is applied to a valve plug, the disclosed examples may produce a valve plug including a second amount of material, less than the first amount. In some examples, producing the valve plug with the first amount of material costs a first amount and producing the valve plug with the second amount of material costs a second amount less than the first amount.

In examples in which trim components for valves are generated, the trim components can be structured to control flow characteristics such as, for example, an equal percentage characteristic, a linear characteristic, a quick opening characteristic, a noise attenuation characteristic and/or an anti-cavitation characteristic. Using the examples disclosed herein, customers are able to have valve components produced having trim options that are structured for their specific process applications even when the customer requires a non-standard trim option to meet their specific demands. Put another way, the examples disclosed herein enable custom or tailored solutions to be produced using, for example, additive manufacturing, parametric three-dimensional (3D) modeling, example work flows and/or example user interfaces.

To enable a valve component to be produced according to the teachings of this disclosure, in some examples, a customer logs into an online web application and provides data such as, characteristics of the application process and/or whether a standard offering trim package or a custom trim package is desired. The characteristics of the application process may include temperature, pressure, media, valve body type and/or sealing component type. The standard offering trim packages may include noise attenuation trim, anti-cavitation trim, window case trim, etc. When a custom trim package is desired, in some examples, different flow value percentages may be available. For example, different percentages of flow values for the valve plug travel (e.g., increments of 10 percent) may be applied. In response to the data provided, feedback may be generated and accessible by the user interface device in the form of live visual feedback of the 3D model of the part being designed.

To ensure that the trim package selected satisfies engineering parameters, in some examples, characteristics (values) associated with the trim package are compared to reference characteristics (values) to determine if the characteristics and the reference characteristics are within or outside of a threshold of one another or, more generally, to determine if the characteristics and/or the trim package to be produced satisfies engineering parameters. In examples in which the characteristics are within the threshold of the reference characteristics, the characteristics associated with the valve trim are approved or otherwise accepted. However, in examples in which the characteristics and the reference characteristics are outside of the threshold, feedback may be generated and/or provided to the user interface device to prompt the customer to change one or more characteristics of the valve component to enable subsequent characteristics associated with the next custom trim package to satisfy the threshold. In some such examples, the feedback may include an audio and/or visual alert indicating that the component or portion of the component is outside of the suggested engineering parameters. For example, if the engineering parameters suggest that an angle of a part is to be between 40°-45° and the design currently has the angle at 20°, the part may be highlighted and/or some other audio and/or visual alert may be provided to prompt the user to change the angle to be within the suggested range.

To design a trim package or another valve component as requested by a user, the associated parameter values are accessed by a parametrically driven 3D modeling program and used to modify an existing file by, for example, automatically populating values of the percentage flow versus percentage valve travel. To enable the custom trim package to be produced by an additive manufacturing machine, in some examples, the 3D modeling program finalizes the design conditions and/or generates a build file (e.g., an .stl file) that incorporates any modifications to the existing file. The additive manufacturing machine may be a 3D printer associated with powder bed fusion and/or direct energy deposition.

In some examples, after the trim package is produced (e.g., a custom trim package, a standard trim package), machining operations are performed using a computer numerical control (CNC) machine and/or the specifications are verified using a coordinate measuring machine (CMM), an optical comparator and/or a 3D scanning process. When the specifications of the valve component satisfy the threshold, the valve component is used in combination with additional parts to produce a completed valve which can be provided to the customer and/or requester. Alternatively, the valve component itself can be provided to the customer without being integrated into a completed valve. While the above examples involve producing example trim packages, other components may additionally or alternatively be produced.

FIG. 1 illustrates an example system or workflow 100 that may be used to produce one or more valve components. In the illustrated example, an example user interface device 102 provides a user (e.g., a customer) with a user interface that enables the user to generate a request 104 to create a valve component 117. The request 104 includes characteristics provided by the user with respect to the valve component 117 to be created. In some examples, the characteristics include temperature, pressure, media, dimensions, shape(s), the type of valve body (e.g., globe valve body, etc.), the type of sealing components (e.g., valve seats, valve plugs, etc.) or, more generally, characteristics of the environment in which the fluid control device is to be used. The environment in which the control device is to be used may include dirty service, clean service, oil & gas industries, pulp & paper industries, etc. Additionally or alternatively, the characteristics can be associated with whether the component 117 is a standard component or a custom component. As set forth herein, the phrase "custom component" means a component having specifications different than the specifications of the components that are regularly produced. When the characteristics are associated with a standard component, the characteristics may be associated with noise attenuation, anti-cavitation, window cage, etc. When the characteristics are associated with a custom component, the characteristics may include percentage flow values that are different than the percentage flow values associated with the standard component. Of course, different values and/or different characteristics may be associated with the component depending on what component is being produced.

To ensure that the characteristics of the request 104 satisfy engineering parameters, the request 104 is accessed by an example valve component characteristic(s) analyzer 106 of an example computer 108. In this example, the analyzer 106 compares the user-selected component characteristics to reference characteristics stored at an example database 110 to determine if the component characteristics and the reference characteristics satisfy a threshold. When the component characteristics do not satisfy the threshold, the analyzer 106 generates feedback 111 provided to the user by the user interface device 102. For example, the user-selected component characteristic may be a 18.5 mm flow area, the reference characteristic may be a 19 mm flow area and the threshold may be 5%, in which case the user-selected component characteristic satisfies the threshold. The feedback 111 may be visual and/or audio feedback. The feedback 111 may indicate that a valve component manufactured according to the initial request 104 is not producible or does not satisfy one or more of the engineering parameters. Additionally or alternatively, the feedback 111 may include suggested modifications to the initial request to enable subsequent user-selected valve component characteristics to satisfy the threshold.

When the initially or later selected component characteristics satisfy the threshold, in the illustrated example, the computer 108 includes an example valve component designer 116 that generates a build file 112 used by an example additive manufacturing machine 114 to produce the desired component 117. In some examples, the valve component designer 116 uses the valve component characteristics in association with a parametrically driven 3D modeling program to generate the build file 112. In examples in which the valve component characteristics are associated with a custom component, the valve component designer 116 may modify a reference build file associated with a standard component using, for example, the characteristics (values) of the percentage flow versus percentage valve travel. In other examples, the valve component designer 116 accesses the build file 112 from the database 110.

In some examples, the build file 112 enters a work flow queue to produce the part at the additive manufacturing machine 114. In such examples, the build file 112 acts as a work order. To enable the user of the user interface device 102 to view the component 117 being designed, in some examples, a live visual feed of the 3D model generated by the valve component designer 116 is accessible by the user interface device 102. The live visual feed may include messages and/or visual alerts that indicate when a characteristic is outside of a suggested characteristic for a particular component. For example, a side of the part being designed may become a different color when its associated characteristics do not satisfy the suggested reference characteristics.

To generate the valve component 117, the additive manufacturing machine 114 accesses the build file 112 that defines the dimensions and/or any other parameters and/or characteristics of the valve component 117 to be produced. After the additive manufacturing machine 114 produces the valve component 117, an example post production machine 118 performs one or more post production processes on the valve component 117. In some examples, the post-production processes change the surface of the valve component 117 using plating processes, coating processes (e.g., epoxy coating), sanding processes, bead blasting processes, shot peening processes, heat treatment processes and/or tumbling processes. Additionally or alternatively, the post-production processes may include processes that remove material from the valve component 117 (subtractive machining processes) using, for example, a CNC machine, a drilling machine, a mill, a lathe, etc.

In the illustrated example, an example characteristics verifying machine 122 verifies the specifications of an example finished valve component 120 produced from the valve component 117. The characteristics verifying machine 122 may be implemented by a CMM and/or a 3D scanner that accesses reference data from an example database 124. When the characteristics verifying machine 112 is unable to verify the specifications of the finished valve component 120, because, for example, the specifications do not satisfy a threshold, in this example, an example alerter 126 is configured to generate an alert to notify an operator that the finished valve component 120 does not meet the design specifications and/or otherwise rejects the parts. However, if the characteristics verifying machine 122 determines that the finished valve component 120 meets the design specifications, in some examples, an example valve assembler 128 accesses additional parts or components 130, if available and/or requested to do so, and assembles the parts including the finished valve component 120 into a completed valve 132. The completed valve 132 may be provided to the requester of the finished valve component 120 and/or an individual that is associated with the user interface device 102. In other examples, the finished valve component 120 itself is provided to the requester of the finished valve component 120.

Figure 2:
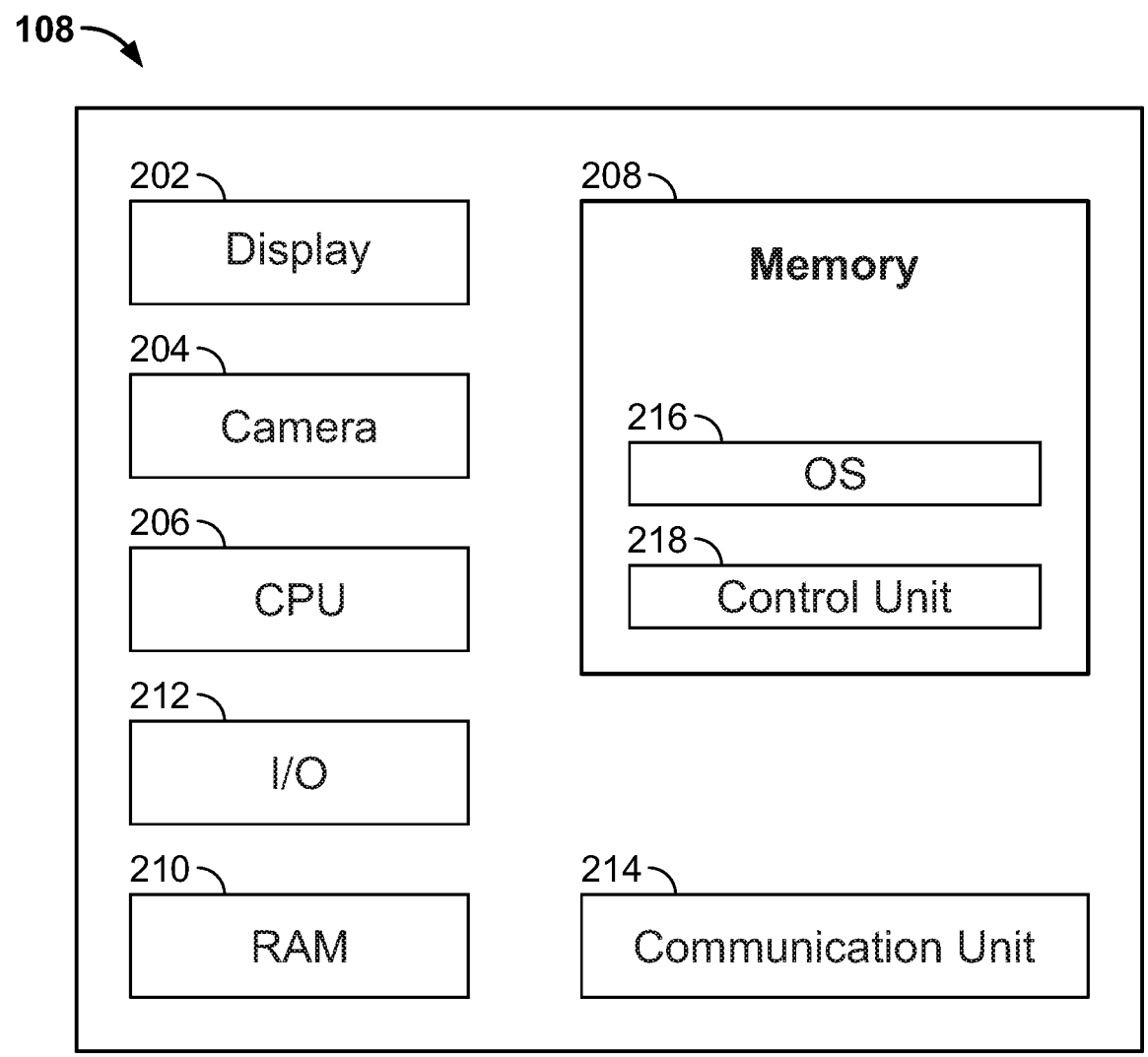
FIG. 2 is a block diagram of an example computer employed in the system of FIG. 1.

FIG. 2 illustrates a block diagram of an example of the computer 108 of FIG. 1. The computer 108 may be a desktop computer such as a traditional operator workstation, a control room display, or a mobile computing device such as a laptop computer, a tablet computer, a mobile device smartphone, a personal digital assistant (PDA), a wearable computing device, or any other suitable client computing device. The computer 108 may include a display 202 and one or more cameras 204 or image sensors. The one or more cameras 204 may include depth sensors, such as Light Detection and Ranging (LIDAR) or any other suitable 3D image sensors. Further, the computer 108 includes one or more processors or CPUs 206, a memory 208, a random-access memory (RAM) 210, an input/output (I/O) circuit 212, and a communication unit 214 to transmit and receive data via a local area network, a wide area network, or any other suitable network. The computer 108 may, using the communication unit 214, communicate with the user interface device 102, the additive manufacturing machine 114, the post production machine 118, the characteristics verifying machine 122 and/or any other suitable computing device.

In the illustrated example, the memory 208 includes an operating system 216 and a control unit 218 for controlling the display 202 and communicating with the user interface device 102, the additive manufacturing machine 114, the post production machine 118 and/or the characteristics verifying machine 122 to control the manufacturing and/or assembly process as disclosed herein. In some examples, the control unit 218 obtains user input from the I/O circuit 212, such as details of the application process and/or the specifications of a part that a user at the user interface device 102 would like to have produced.

In some examples, the control unit 218 implements the analyzer 106 and determines whether the characteristics (e.g., details) of the request 104 satisfy one or more engineering parameters. In some examples, based on the analysis of the request 104, the control unit 218, implementing the analyzer 106, generates the feedback 111 based on the analysis. For example, the control unit 218 may generate the feedback 111 for display at the user interface device 102 approving the design of the valve component according to the request 104 or the control unit 218 may generate the feedback 111 for display at the user interface device 102 disapproving the design according to the request 104. In some examples, the control unit 218 implements the valve component designer 116 and generates and/or accesses the build file 112 used by the additive manufacturing machine 114 to produce the valve component designer 116.

Figure 3:
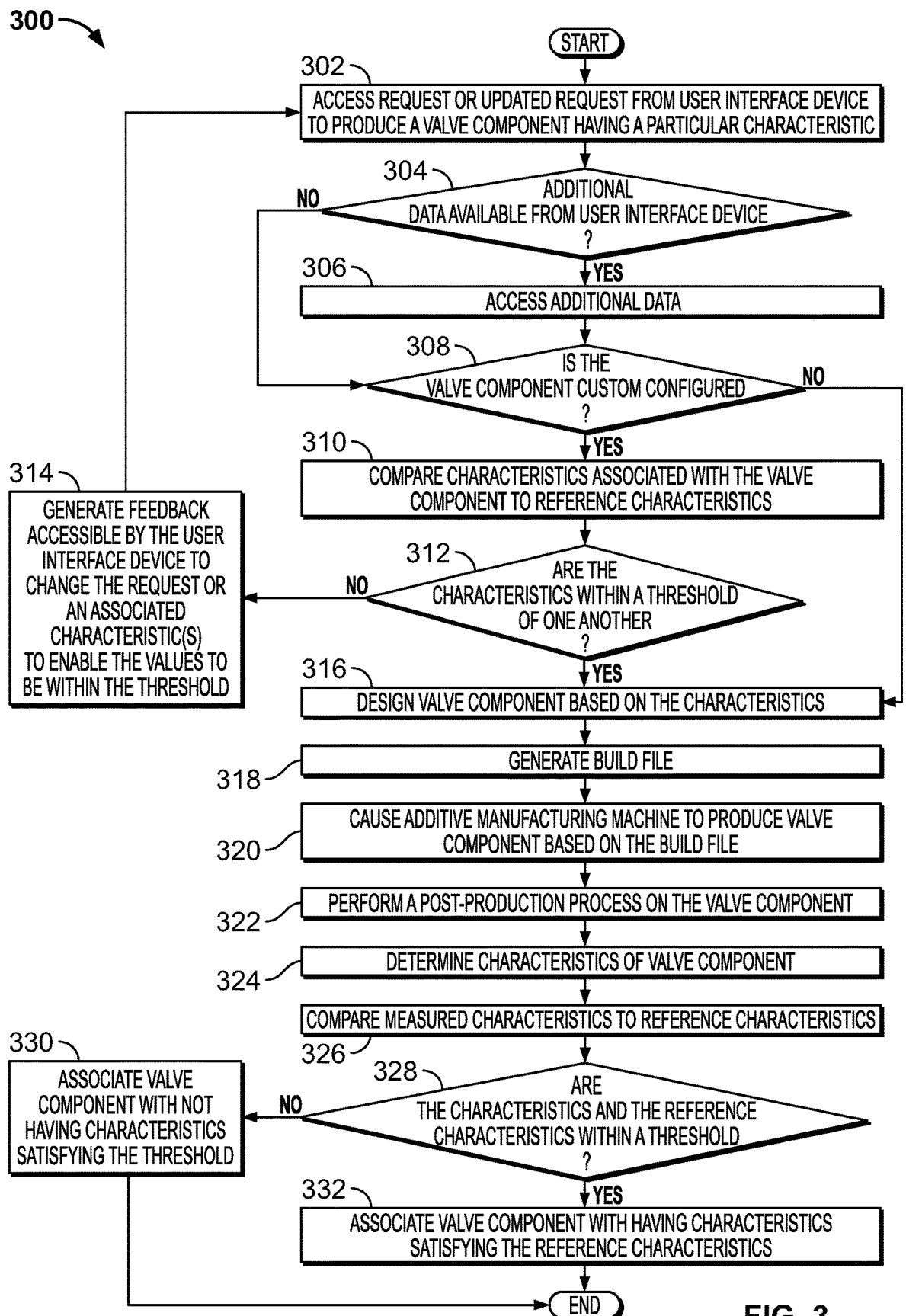
FIG. 3 is a flow diagram representative of an example method for implementing the example system of FIG. 1.
Figure 4:
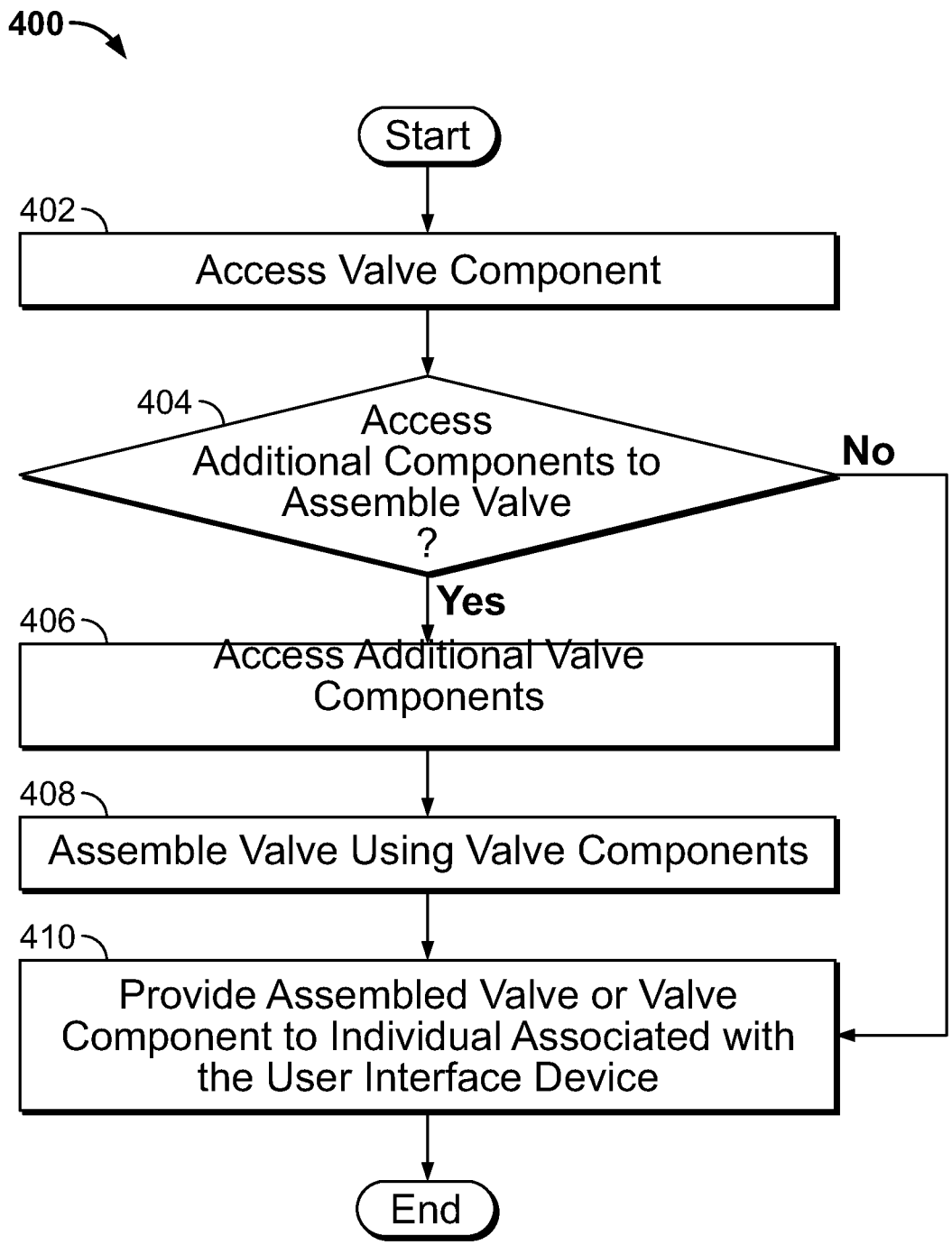
FIG. 4 is another flow diagram representative of another example method for implementing the example system of FIG. 1.
Figure 5:
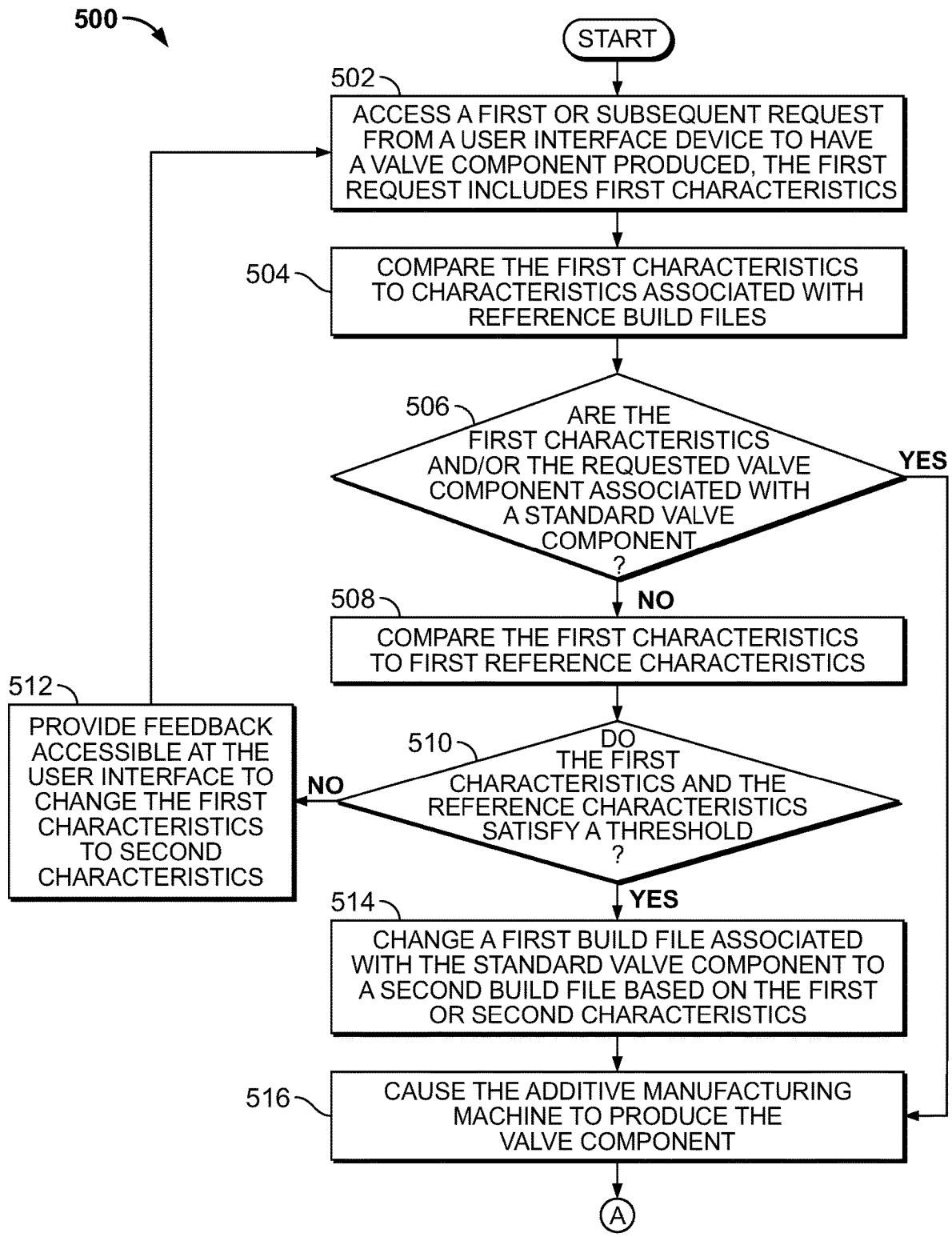
FIG. 5 is another flow diagram representative of another example method for implementing the example system of FIG. 1.
Figure 5:
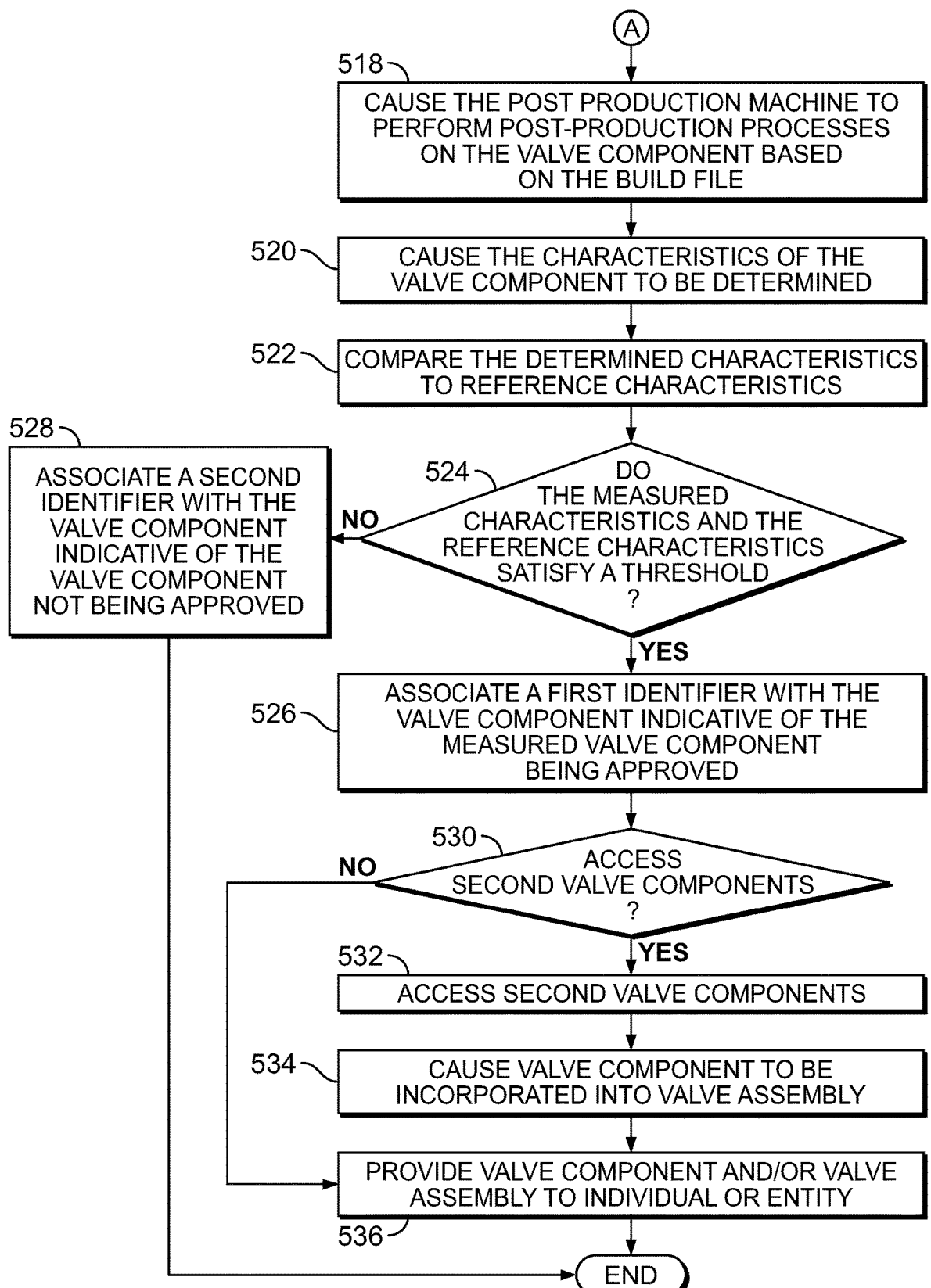

FIGS. 3, 4 and 5 depict flow diagrams representing example methods 300, 400, 500 that can be used to implement the example system 100 of FIG. 1. The methods 300, 400, 500 may be executed by the one or more of the user interface device 102, the analyzer 106, the computer 108, the valve component designer 116, the additive manufacturing machine 114, the post production machine 118, the characteristics verifying machine 122, the valve assembler 128, the control unit 218 and/or by any other computing device. While the methods 300, 400, 500 are described in a particular order, the order that the blocks are executed may be changed and/or one or more of the blocks may be changed, divided, eliminated or combined. Further, while the processes disclosed below are described in connection with automatic processes, any and/or all of the processes disclosed may instead be implemented manually.

FIG. 3 illustrates the method 300 that may be executed to implement at least a portion of the system 100 of FIG. 1. In some examples, one or more aspects of the method 300 are representative of computer-readable instructions that may be executed to implement the system 100 of FIG. 1. The method 300 begins by the analyzer 106 accessing the request 104 from the user interface device 102 to produce a valve component having a particular characteristic (block 302). The characteristic may, for example, include the dimensions of the desired valve component. The computer 108 determines if there is additional data available from the user interface device 102 (block 304). In some examples, the additional data available may include characteristics provided at the user interface device 102 of the environment in which the valve component is to be used. If there is additional data available, the analyzer 106 accesses the data (block 306).

After the analyzer 106 accesses the data and/or the request 104 from the user interface device 102, the computer 108 determines if the valve component is custom configured (block 308). In some examples, the valve component is custom configured when the requested characteristics (e.g., values, dimensions) are different from the characteristics (e.g., values, dimensions) of valve components that are commonly produced and/or that have an existing build file available for use by the additive manufacturing machine 114. If the computer 108 determines that the valve component is custom configured, the analyzer 106 compares the characteristics (e.g., dimensions) with the reference characteristics stored at the database 110 (block 310). At block 312, the analyzer 106 determines if the characteristics associated with the request 104 and the reference characteristics stored at the database 110 are within a threshold of one another.

If the characteristics of the request 104 are not within the threshold, the analyzer 106 generates the feedback 111 that is accessible by the user interface device 102 (block 314). In some examples, the user interface device 102 prompts the user of the user interface device 102 to change the request or an associated characteristic(s) of the valve component to enable subsequent characteristics to be within the threshold. The feedback 111 may be in the form of an indicator on a 3D rendering generated by the valve component designer 116 and displayed at the user interface device 102. If the characteristics of the request 104 are within the threshold, the valve component designer 116 designs the valve component according to the characteristics associated with the request 104 (block 316) and the valve component designer 116 generates and/or accesses the build file 112 to produce the valve component 117 (block 318). In some examples, the valve component 117 designed is a standard valve component, while in other examples, the valve component 117 designed is a custom valve component. In examples in which the valve component 117 is a standard valve component, the valve component designer 116 may access the build file 112 associated with the standard valve component from the database 110.

The computer 108 causes the additive manufacturing machine 114 to produce the valve component 117 based on the build file 112 (block 320) and the post production machine(s) performs one or more post-production processes on the valve component 117 to produce the finished valve component 120 (block 322). In some examples, one or more of the post production processes are performed without physically moving the valve component 117 from a first location or machine to a second location or machine. In other words, the additive manufacturing processes and the post production processes may be performed at the same location and/or using the same machine. However, in other examples, one or more of the post production processes may be performed at a different location than where the additive manufacturing processes are performed.

The finished valve component 120 is measured and/or tested using the characteristics verifying machine 122 to analyze the characteristics (e.g., specifications) of the finished valve component 120 (block 324). The characteristics verifying machine 122 compares the determined characteristics of the finished valve component 120 to reference characteristics accessed from the database 124 (block 326) and then determines if the characteristics of the finished valve component 120 and the reference characteristics are within a threshold (block 328). If the measured characteristics do not satisfy the threshold, the characteristics verifying machine 122 and/or the alerter 126 associates the finished valve component 120 with not having characteristics that satisfy the reference characteristics (block 330) and/or the alerter 126 generates an alert to notify an operator that the finished valve component 120 does not satisfy the design characteristics. However, if the measured characteristics satisfy the threshold of the reference characteristics, the characteristics verifying machine 122 and/or the alerter 126 associates the finished valve component 120 with having characteristics that satisfy the reference characteristics (block 332) and/or the alerter 126 generates an alert to notify an operator that the finished valve component 120 satisfies the design characteristics. In some examples, the finished valve component 120 is associated with satisfying and/or not satisfying the design characteristics by associating an identifier with the part and/or part number being produced.

FIG. 4 illustrates the method 400 that may be executed to implement at least a portion of the system 100 of FIG. 1. In some examples, one or more aspects of the method 400 are representative of computer-readable instructions that may be executed to implement the system 100 of FIG. 1. The method 400 begins by the valve assembler 128 accessing the finished valve component 120 (block 402). The valve assembler 128 determines if there are additional parts 130 to be used to assemble the completed valve 132 (block 404).

If the finished valve component 120 is to be used to assemble the completed valve 132, the valve assembler 128 accesses the additional valve components 130 (block 406) and uses the components 120, 130 to produce the completed valve 132 (block 408). In some examples, the additional valve components 130 include a valve body, a valve bonnet, a valve stem, an actuator and/or a valve controller. At block 410, the completed valve 132 and/or the valve component 120 are provided to an individual and/or entity associated with the user interface device 102 (block 410). In some examples, the finished valve component 120 is a valve trim component and the additional components 130 include a valve body, a bonnet, a valve stem, an actuator, etc.

FIG. 5 illustrates the method 500 that may be executed to implement at least a portion of the system 100 of FIG. 1. In some examples, one or more aspects of the method 500 are representative of computer-readable instructions that may be executed to implement the system 100 of FIG. 1. The method 500 begins by the analyzer 106 accessing a first request from the user interface device 102 to produce a valve component (block 502). The first request includes, for example, first characteristics (e.g., dimensions). The analyzer 106 compares the first characteristics to characteristics associated with reference build files (e.g., a first build file)

(block 504) to determine if the first characteristics and the requested valve component more generally is associated with a standard valve component (block 506). When it is determined that the first characteristics are not associated with the reference build files, such that the requested valve component is not associated with a standard valve component, the analyzer 106 compares the first characteristics to first reference characteristics (block 508) to determine if the first characteristics and the reference characteristics satisfy a threshold (block 510).

If the first characteristics do not satisfy the threshold, the analyzer 106 provides feedback 111 accessible at the user interface device 102 to change the first characteristics to second characteristics, where the second characteristics satisfy the threshold (block 512). When the first or second characteristics are not associated with the first build file of the reference build files but satisfy the threshold, the valve component designer 116 changes the first build file to a second build file based on the first or second characteristics (block 514). In some examples, changing the first build file to the second build file includes using a parametric three-dimensional modeling software.

When the first characteristics are associated with the first build file or when the first or second characteristics satisfy the threshold, the computer 108 causes the additive manufacturing machine 114 to produce the valve component 117 (block 516). The computer 108 causes the post production machine 118 to perform post-production processes on the valve component 117 based on the build file 112 (block 518). The computer 108 causes the characteristics verifying machine 122 to measure the characteristics of the valve component 117 (block 520) and to compare the measured characteristics to reference characteristics (block 522) to determine if the measured characteristics satisfy a threshold (block 524).

When the measured characteristics satisfy the threshold of the reference characteristics, the characteristics verifying machine 122 and/or the alerter 126 associates the finished valve component 120 with a first identifier indicative of the measured valve component 120 being approved (block 526). When the measured characteristics do not satisfy the threshold of the reference characteristics, the characteristics verifying machine 122 and/or the alerter 126 associates the finished valve component 120 with a second identifier indicative of the valve component not being approved (block 528). The computer 108 determines whether to access second valve components 130 (block 530), e.g., for assembly with the finished valve component 120. If the second valve components 130 are to be accessed, the computer 108 causes the valve assembler 128 to access second valve components 130 (block 532) and causes the finished valve component 120 to be incorporated into the valve 132 including the second valve components 130 (block 534). The valve 132 or the finished valve component 120 is provided to an individual or an entity associated with the first request 104 (block 536).

Figure 6:
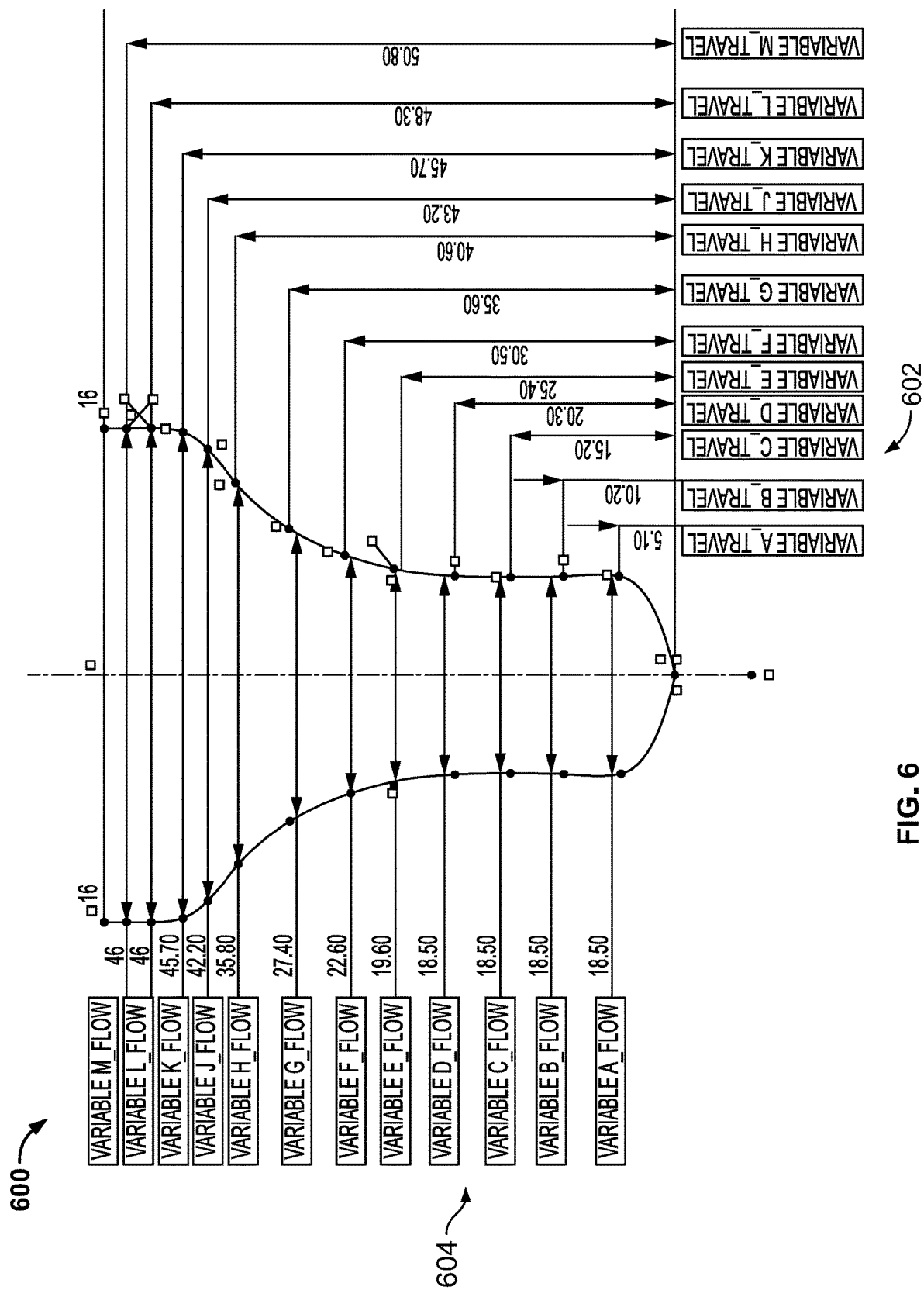
FIG. 6 illustrates an example graph used to produce example valve components in accordance with the teachings of this disclosure.

FIG. 6 illustrates an example graph 600 including a parabolic flow curve that can be used to implement the examples disclosed herein. Specifically, the parabolic flow curve represents flow areas at different travel distances of a fluid control device and can be displayed at the user interface device 102 in response to user-input received. For example, at a travel of 5.1 centimeters (cm), the flow area is 18.5 cm. As shown, the x-axis 602 is associated with travel and/or horizontal linear dimensions and the y-axis 604 is associated with flow and/or linear dimensions.

FIG. 7 illustrates an example user interface 700 that can be used to implement the examples disclosed herein and that may be displayed at the user interface device 102 of FIG. 1. Specifically, the user interface 700 of FIG. 7 illustrates a table into which values can be entered that generates the parabolic flow curve of FIG. 6. As shown, the user interface 700 includes a first column 702 listing the names of global variables and a second column 704 listing the values and/or equations associated with the respective global variables. In some examples, a user can enter values into fields of the second column 704 to change the parabolic flow curve shown in FIG. 6. In this example, the user interface 700 includes a third column 706 listing the values associated with the global variables and/or generated by entering values into the equations included in the fields of the second column 704 and a fourth column 708 associated with comments.

Figure 8:
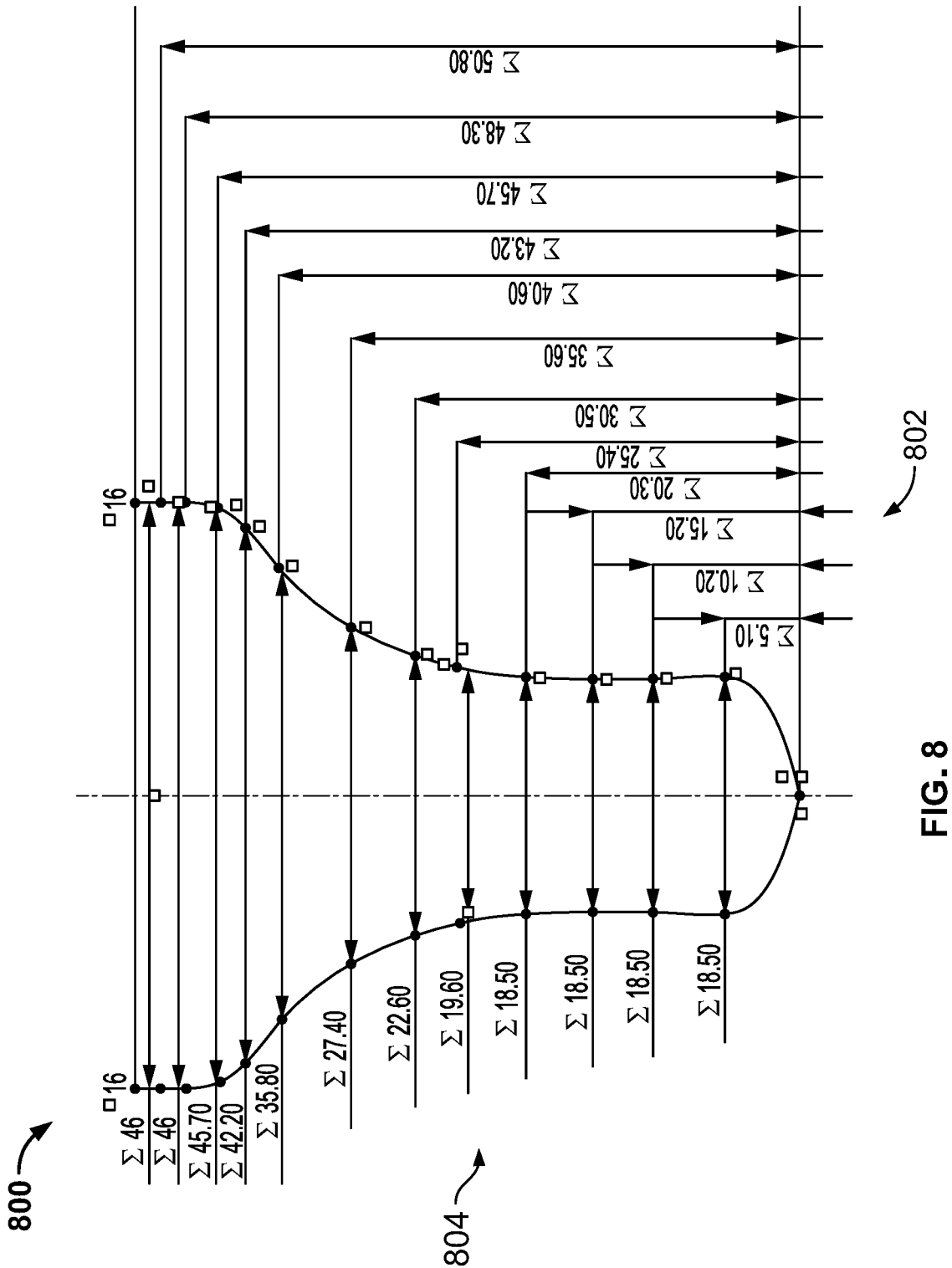
FIG. 8 illustrates another example graph used to produce example valve components in accordance with the teachings of this disclosure.

FIG. 8 illustrates another example graph 800 that can be used to implement the examples disclosed herein and that may be displayed at the user interface device 102. Specifically, the graph 800 represents a parametric sketch of a 3-D model that is controlled by the associated equations included in or associated with the fields of the second column 704 of FIG. 7. As shown, the x-axis 802 is associated with travel and the y-axis 804 is associated with flow. In contrast to the graph 600 of FIG. 6, the graph 800 of FIG. 8 illustrates the association between the second and third columns 704, 706, enabling value changes to automatically update the geometry of the associated 3D model.

Figure 9:
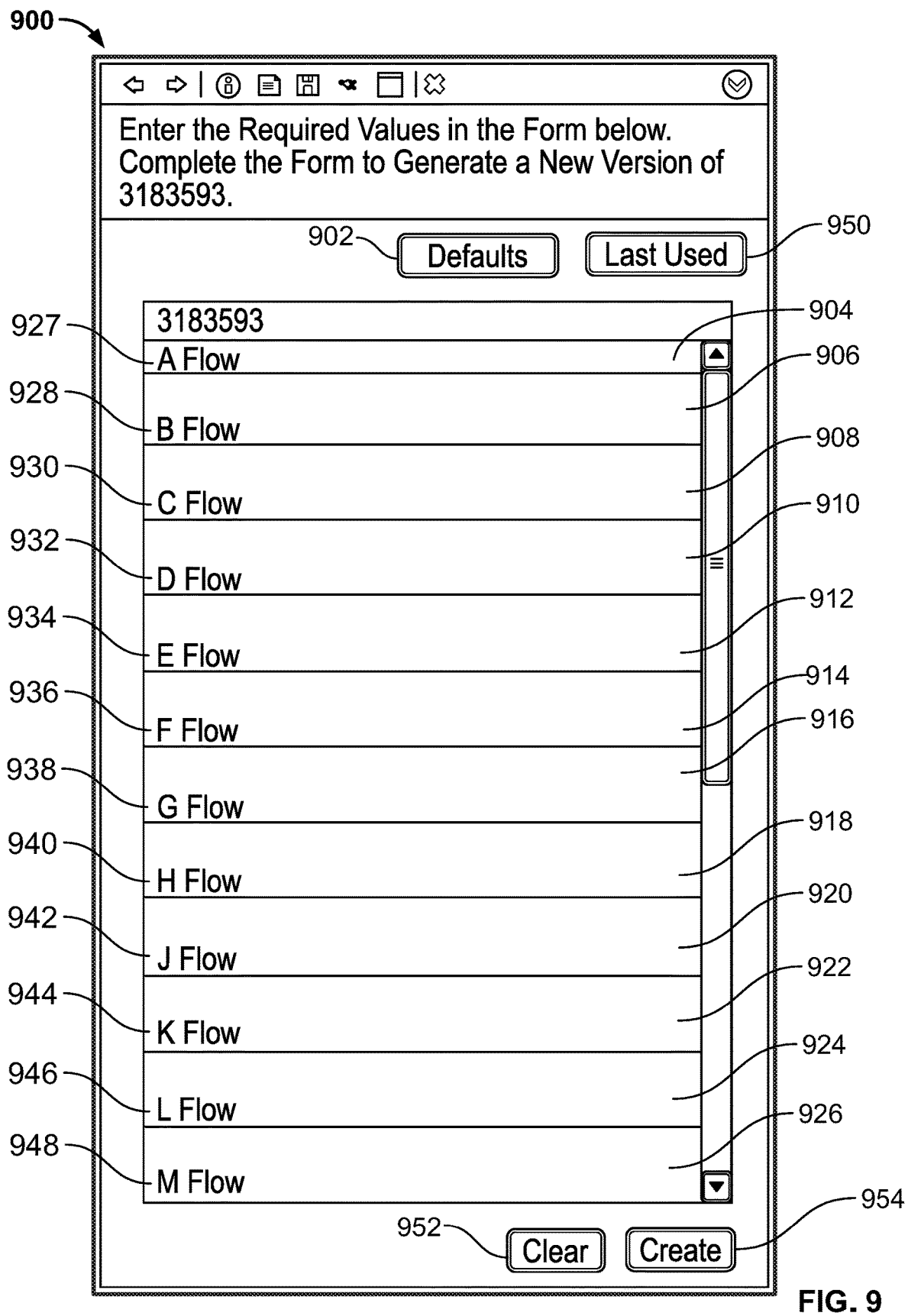
FIG. 9 illustrates another example user interface that can be displayed at the example user interface device of the system of FIG. 1.

FIG. 9 illustrates an example user interface 900 that can be used to implement the examples disclosed herein and that may be displayed at the user interface device 102 of FIG. 1. Specifically, the user interface 900 of FIG. 9 enables a user to enter values at the associated fields similar to the user interface of FIG. 7. As shown, the user interface 900 includes a defaults tab 902 that is selectable to enable default values to populate fields 904, 906, 908, 910, 912, 914, 916, 918, 920, 922, 924, 926 associated with different flows 927, 928, 930, 932, 934, 936, 938, 940, 942, 944, 946, 948. Alternatively, a user can enter values into the fields 904-926. In this example, the user interface 900 also includes an example last used tab 950 that is selectable to enable the fields 904-948 to be populated with values last used. To enable the values to be cleared, the user interface 900 includes a clear tab 952 and to enable the request 104 to be generated, the user interface 900 include an example create tab 954.

FIG. 10 illustrates an example user interface 1000 that can be used to implement the examples disclosed herein. As shown, the user interface 1000 includes engineering parameters (rules) associated with the manufacturing of, for example, trim packages. As an example of an engineering rule, when the A-flow value is entered as 18.5, the B-flow value is entered as 5.0 and the C-flow value is entered as 18.5, an error message may be provided because there is a difference greater than 5% between the A-flow value and the B-flow value and between the B-flow value and the C-flow value. However, the user interface 1000 may include the ability to produce different parts and/or includes the ability to add, remove and/or change rules to produce parts disclosed.

Figure 11:
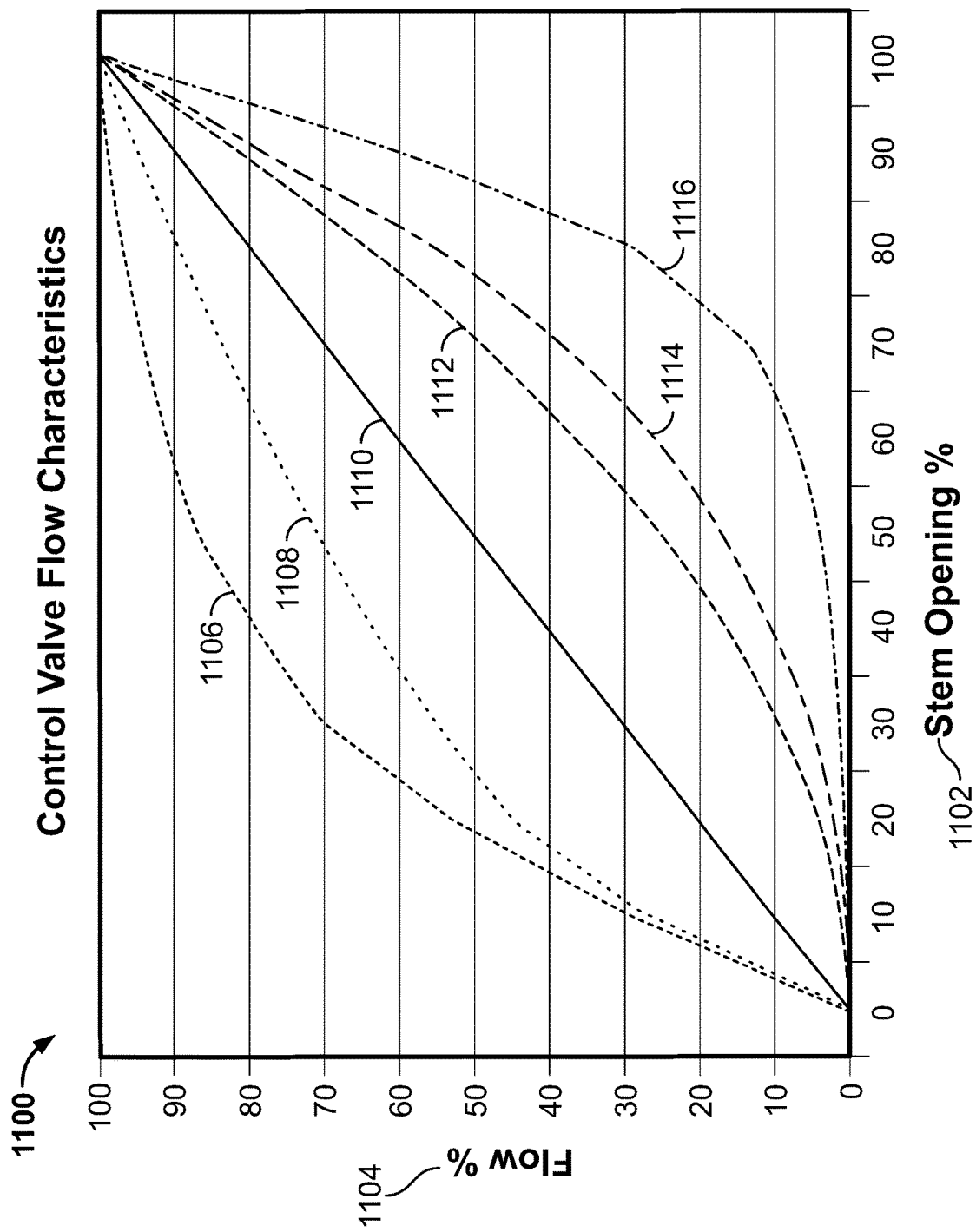
FIG. 11 illustrates another example graph used to produce example valve components in accordance with the teachings of this disclosure.

FIG. 11 illustrates an example graph 1100 including an x-axis 1102 associated with stem opening % and a y-axis 1104 associated with flow %. As shown, flow characteristics are associated with an amount of valve plug travel. For example, the greater the percentage of valve plug travel, the greater the percentage of flow through the valve. As shown, a first line 1106 is associated with quick opening flow characteristics, a second line 1108 is associated with square root flow characteristics, a third line 1110 is associated with linear flow characteristics, a fourth line 1112 is associated with modified parabolic flow characteristics, a fifth line 1114 is associated with equal percentage flow characteristics and a sixth line 1116 is associated with hyperbolic flow characteristics.

The examples disclosed herein relate to apparatuses and methods for enabling valve components, including custom valve components, to be produced on demand and, in some cases, assembled into completed valve assemblies. While the examples described herein mention producing particular valve components such as, for example, valve plugs, valve seat rings, valve cages, the teachings of this disclosure can be used to produce other valve components or fluid control devices themselves. For example, the disclosed examples can be used to produce rotary segmented balls or lattice drive features for noise attenuation and/or flame arresting.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The figures are not to scale and the same reference numbers may be used to describe like or similar parts. As used herein, the phrases, "a," "an," "the," "at least one of," "including," "having," are open ended. Thus, the singular form "a" does not exclude its plural form and the phrase "at least one of" is open ended in the same manner that the term "comprising" is open ended. As used herein, the phrases "coupled," "rotatably coupled," "fixedly coupled," "connected," rotatably connected," "fixedly connected" or any other words used to describe the relationship between parts are open ended. Thus, when a first part is "fixedly coupled" to a second part, the first part may be directly coupled to the second part without any intervening parts or the first part may be indirectly coupled to the second part with one or more intervening parts disposed between the first and second parts.

Further, while several examples have been disclosed herein, any features from any examples may be combined with or replaced by other features from other examples. Moreover, while several examples have been disclosed herein, changes may be made to the disclosed examples within departing from the scope of the claims.

The invention claimed is:

1. A method of producing a valve component, comprising:
accessing, using one or more processors, a first request from a user interface device to produce a valve component, the first request specifying first characteristics of the valve component;
determining whether the first characteristics are associated with a first build file;
when it is determined that the first characteristics are not associated with the first build file, comparing, using the one or more processors, the first characteristics to first reference characteristics to determine if the first characteristics satisfy a threshold;
providing feedback, using the one or more processors, accessible at the user interface device to prompt a change of the first characteristics to second characteristics in response to the first characteristics not satisfying the threshold, wherein the second characteristics satisfy the threshold;
accessing, using the one or more processors, the second characteristics from the user interface device in response to the prompt; and
when the first characteristics are associated with the first build file or when the first characteristics or the second characteristics satisfy the threshold, causing, using the one or more processors, an additive manufacturing machine to produce the valve component.

2. The method of claim 1, wherein when the first characteristics are changed to the second characteristics, determining whether the second characteristics are associated with the build file, and wherein, when it is determined that the first and second characteristics are not associated with the first build file, changing the first build file to a second build file based on the first or second characteristics, and causing the additive manufacturing machine to produce the valve component based on the second build file.

3. The method of claim 2, wherein changing the first build file to the second build file includes using parametric three-dimensional modeling software.

4. The method of claim 1, further including causing post-production processes to be performed on the valve component based on the first build file.

5. The method of claim 4, further including causing the characteristics of the valve component to be measured and comparing the measured characteristics to second reference characteristics to determine if the measured characteristics satisfy a second threshold, and wherein when the measured characteristics satisfy the second threshold, associating a first identifier with the valve component, and wherein when the measured characteristics do not satisfy the second threshold, associating a second identifier with the valve component.

6. The method of claim 1, further including accessing second valve components and causing the valve component to be incorporated into a valve assembly including the second valve components.

7. The method of claim 6, further including providing the valve assembly to an individual or an entity associated with the first request.

8. The method of claim 1, further including providing the valve component to an individual or an entity associated with the first request.

9. An apparatus for producing valve components, the apparatus comprising:
one or more processors;
a communication unit; and one or more non-transitory computer-readable media coupled to the one or more processors and to the communication unit, the one or more non-transitory computer readable media storing instructions thereon that, when executed by the one or more processors, cause the one or more processors to:

access a first request from a user interface device to produce a valve component, the first request specifying first characteristics of the valve component;

determine whether the first characteristics are associated with a first build file;

when it is determined that the first characteristics are not associated with a first build file, compare the first characteristics to reference characteristics to determine if the first characteristics satisfy a threshold;

provide feedback accessible at the user interface to prompt a change of the first characteristics to second characteristics in response to the first characteristics no satisfying the threshold, wherein the second characteristics satisfy the threshold; and when the first characteristics are associated with the first build file or when the first characteristics or the second characteristics satisfy the threshold, cause an additive manufacturing machine to produce the valve component.

10. The apparatus of claim 9, wherein, when the first characteristics are changed to the second characteristics, the instructions, when executed by the one or more processors, further cause the one or more processors to determine whether the second characteristics are associated with the build file, and wherein, when it is determined that the first and second characteristics are not associated with the first build file, the instructions, when executed by the one or more processors, further cause the one or more processors to change the first build file to a second build file based on the first or second characteristics and cause the additive manufacturing machine to produce the valve component based on the second build file.

11. The apparatus of claim 10, wherein changing the first build file to the second build file includes using parametric three-dimensional modeling software.

12. The apparatus of claim 9, wherein, when the first characteristics are not associated with the first build file, the instructions, when executed by the one or more processors, further cause the one or more processors to cause post-production processes to be performed on the valve component based on the first build file.

13. The apparatus of claim 12, wherein the instructions, when executed by the one or more processors, further cause the one or more processors to:
  cause the characteristics of the valve component to be measured;
  compare the measured characteristics to second reference characteristics to determine if the measured characteristics satisfy a second threshold;
  when the measured characteristics satisfy the threshold, cause a first identifier to be associated with the valve component; and
  when the measured characteristics do not satisfy the threshold, cause a second identifier to be associated with the valve component.

14. The apparatus of claim 9, wherein the instructions, when executed by the one or more processors, further cause a valve assembly including the valve component to be provided to an individual or an entity associated with the first request or cause the valve component to be provided to the individual or the entity associated with the first request.

15. One or more non-transitory computer readable media storing instructions thereon that, when executed by one or more processors, cause the one or more processors to:
  access a first request from a user interface device to produce a valve component, the first request specifying first characteristics of the valve component;
  determine whether the first characteristics are associated with a first build file;
  when it is determined that the first characteristics are not associated with a first build file, compare the first characteristics to reference characteristics to determine if the first characteristics satisfy a threshold;
  provide feedback accessible at the user interface to prompt a change of the first characteristics to second characteristics in response to the first characteristics not satisfying the threshold, wherein the second characteristics satisfy the threshold; and
  when the first characteristics are associated with the first build file or when the first characteristics or the second characteristics satisfy the threshold, cause an additive manufacturing machine to produce the valve component.

16. The one or more non-transitory computer readable media of claim 15, wherein, when the first characteristics are changed to the second characteristics, the instructions, when executed by the one or more processors, further cause the one or more processors to determine whether the second characteristics are associated with the build file, and wherein when the first and second characteristics are not associated with the first build file, the instructions, when executed by the one or more processors, further cause the one or more processors to change the first build file to a second build file based on the first or second characteristics and cause the additive manufacturing machine to produce the valve component based on the second build file.

17. The one or more non-transitory computer readable media of claim 16, wherein changing the first build file to the second build file includes using parametric three-dimensional modeling software.

18. The one or more non-transitory computer readable media of claim 15, wherein, when the first or second characteristics are not associated with the first build file, the instructions, when executed by the one or more processors, cause the one or more processors to further cause post-production processes to be performed on the valve component based on the first build file.

19. The one or more non-transitory computer readable media of claim 15, wherein the instructions, when executed by the one or more processors, further cause the one or more processors to:
  cause the characteristics of the valve component to be measured;
  compare the measured characteristics to reference characteristics to determine if the measured characteristics satisfy a threshold;
  when the measured characteristics satisfy the threshold, cause a first identifier to be associated with the valve component; and
  when the measured characteristics do not satisfy the threshold, cause a second identifier to be associated with the valve component.

20. The one or more non-transitory computer readable media of claim 15, wherein the instructions, when executed by the one or more processors, further cause a valve assembly including the valve component to be provided to an individual or an entity associated with the first request or cause the valve component to be provided to the individual or the entity associated with the first request.

* * * * *

UNITED STATES PATENT AND TRADEMARK OFFICE
CERTIFICATE OF CORRECTION

PATENT NO.        : 10,732,609 B2
APPLICATION NO.   : 16/056027
DATED             : August 4, 2020
INVENTOR(S)       : Thomas N. Gabriel Page 1 of 1

It is certified that error appears in the above-identified patent and that said Letters Patent is hereby corrected as shown below:

On the Title Page

Item (57), Line 2, "are" should be -- and --.

In the Specification

At Column 13, Line 48, "rotatably connected,"" should be -- "rotatably connected," --.

In the Claims

At Column 15, Line 13, "no" should be -- not --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*